(12) United States Patent
Yamauchi

(10) Patent No.: US 6,397,964 B1
(45) Date of Patent: Jun. 4, 2002

(54) SCOOTER TYPE VEHICLE

(75) Inventor: Kosaku Yamauchi, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/691,773

(22) Filed: Oct. 18, 2000

(30) Foreign Application Priority Data

Oct. 19, 1999 (JP) ............................................. 11-297299

(51) Int. Cl.[7] ................................................. B62J 35/00
(52) U.S. Cl. ....................... 180/229; 180/68.4; 180/311; 280/835
(58) Field of Search ................................. 180/219, 229, 180/68.4, 68.5, 311, 312; 280/830, 833, 834, 835

(56) References Cited

U.S. PATENT DOCUMENTS 4,723,617 A * 2/1988 Kitada
5,145,023 A * 9/1992 Tsurumi et al.
5,984,035 A * 11/1999 Katoh et al.

FOREIGN PATENT DOCUMENTS

| JP | 05-185976 | 7/1993 |
| JP | 08-18586 | 2/1996 |
| JP | 09-011957 | 1/1997 |
| JP | 10-203460 | 8/1998 |

\* cited by examiner

*Primary Examiner*—Kevin Hurley
(74) *Attorney, Agent, or Firm*—Darby & Darby

(57) ABSTRACT

The part of the bodywork between the frame head pipe and the saddle is bent downwards and formed with a low-floor, step board at the bottom thereof. This bodywork is further formed with a tunnel structure forming an engine tunnel which is extended fore and aft and ridged upward around the center of the step board with respect to the left and right direction thereof, defining a step-through space. A pair of lower down tubes and a pair of upper down tubes, both on the right and left sides, are downwardly and rearwardly extended from the head pipe in front of the step-through space so as to frame a fuel tank and radiator, in the upper and lower positions, respectively. The fuel tank, which is arranged above the radiator, has a lower part, namely bulge portion, which bulges downwards over the upper edge of the radiator and toward the rear space of the radiator located below the fuel tank. The forward face of the bulge portion, opposing the rear of the radiator is adapted to be inclined rearward and downward of the vehicle body.

4 Claims, 3 Drawing Sheets

SCOOTER TYPE VEHICLE

BACKGROUND OF THE INVENTION (1) Field of the Invention

The present invention relates to a large-sized scooter type vehicle incorporating an engine with a large displacement, and more detailedly relates to improvement of the arrangement of the fuel tank and the radiator.

(2) Description of the Prior Art

There have been various types of two-wheeled vehicles. In recent years, large-sized scooters incorporating an engine with a large displacement have drawn market attention and been developed.

As the prior art documents related to this, Japanese Patent Application Laid-Open Hei 10 No. 203460, 9 No. 11957, Japanese Patent Publication Hei 8 No. 18586 may be referred to.

The development of scooters of this type has been investigated and discussed with concern to various items. One of them is a positional relationship between the fuel tank and the radiator. The most typical method is to build in a fuel tank under the scooter seat. This method, however, requires the seat to be open when refuelling. Further, since the fuel tank is arranged close to the storage box for a helmet etc., there is a concern that the fuel may stain the helmet etc., during refuelling, unwillingly.

In view of the above point, a method has been proposed in which the fuel tank is arranged inside a tunnel formed under the step-through space of the scooter so as to allow for refuelling while the rider is seated. This method also poses a similar difficulty to the above, that is, there is a concern that rider's shoes or clothes may be stained with the fuel because the legs will be set close to the fuel tank. Further, since the fuel tank is located at a lower position, the operator has to bend over to open and close the fuel tank cap. Moreover, if the radiator is arranged in front of the fuel tank, it is necessary to provide an air flow passage of cooling air between the fuel tank and the radiator.

SUMMARY OF THE INVENTION

The present invention has been devised in view of the above difficulties and it is therefore an object of the present invention to provide a scooter type vehicle which allows for refuelling without the necessity for the seat to be opened, is avoidable from the unwilling fuel staining, and allows the operator to open and close the fuel tank cap in an easy position.

In order to achieve the above object, the present invention is configured as follows:

In accordance with the first aspect of the present invention, a scooter type vehicle includes:

a front fork assembly having a rotatable front wheel at the lower position thereof and a handlebar at the upper position thereof;

a head pipe at the front end of the bodywork frame, rotatably supporting the front fork assembly;

part of the bodywork being bent downwards between the head pipe and a saddle, defining a step-through space; and a low floor, step board arranged at the bottom of the step-through space, and is characterized in that a pair of left and right down tubes are downwardly and rearwardly extended from the head pipe in front of the step-through space so as to frame a fuel tank and planiform radiator, in the upper and lower positions, respectively; the fuel tank, which is arranged above the radiator, has a lower part which bulges downwards over the upper edge of the radiator and toward the rear space of the radiator located below the fuel tank; and the forward face of the bulge portion, opposing the rear face of radiator is adapted to be inclined rearward and downward.

In accordance with the second aspect of the present invention, the scooter type vehicle having the above first feature further includes:

an engine and transmission integrally formed into an engine unit;

an engine case portion which integrally incorporates the crankshaft of the engine unit and the transmission and is arranged under the saddle;

a cylinder portion projected forwards in an approximately horizontal direction from the engine case portion; and a tunnel structure forming an engine tunnel, which is extended fore and aft and ridged upward in the step-through space around the center of the step board with respect to the left and right direction thereof, and is characterized in that the cylinder portion is arranged inside the engine tunnel while a spark plug provided on top of the cylinder head is arranged with its fastening axis aligned to the direction toward the downwardness of the fuel tank.

In accordance with the third aspect of the present invention, the scooter type vehicle having the above first feature is characterized in that the radiator arranged below the fuel tank in the rear of the front wheel is attached to the bodywork so as to be inclined with its lower portion directed forward.

In accordance with the fourth aspect of the present invention, the scooter type vehicle having the above second feature is characterized in that the radiator arranged below the fuel tank in the rear of the front wheel is attached to the bodywork so as to be inclined with its lower portion directed forward.

Here, the engine portion of the engine unit of the present invention is not particularly limited, and may include various types such as a parallel two-cylinder engine, parallel three-cylinder engine, V-type two-cylinder engine, V-type four-cylinder engine and horizontal opposed type two cylinder.

According to the above first configuration of the present invention, since the fuel tank is arranged at a high position in the step-through space, separately from the saddle, refuelling can be performed without opening and closing the saddle. Further, it is possible for the operator to open and close the cap of the fuel tank, in their relatively conformable position. Since the fuel tank is disposed away from the storage box or rider's legs, there is little concern that the fuel might unwillingly stain rider's shoes, clothes etc.

According to the above second configuration of the present invention, it is possible to improve the cooling efficiency of the spark plug arranged in the cylinder head of the cylinder as a part of the engine.

According to the above third or fourth configuration of the present invention, since the radiator can be directed as perpendicularly to the air flow as possible, it is possible to reduce the resistance and improve the cooling efficiency.

DESCRIPTION OF THE PREFERRED EMBODIMENT

A preferred embodiment of the present invention will hereinafter be described with reference to the accompanying drawings, but the present invention should not be limited to the embodiment hereinbelow.

Figure 1:
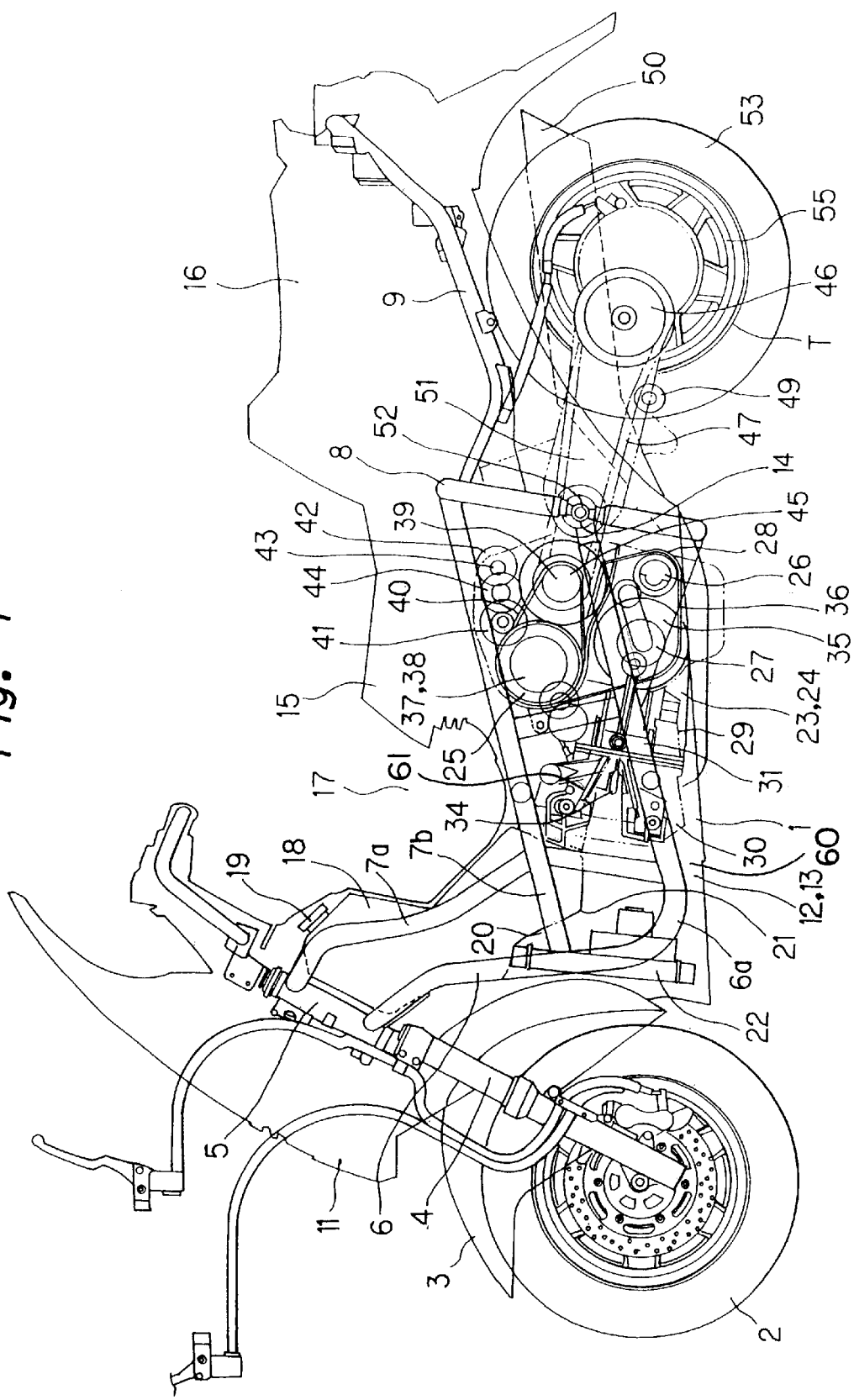
FIG. 1 is an illustrative side view showing the embodiment of a scooter type vehicle according to the present invention.

In a scooter type vehicle of this embodiment, as shown in FIG. 1, the part of the bodywork between a head pipe 5 of a frame 1 and a saddle 15 is bent downwards and formed with a low-floor, step board 60 at the bottom thereof. This bodywork is further formed with a tunnel structure 61 forming an engine tunnel which is extended fore and aft and ridged upward around the center of the step board with respect to the left and right direction thereof, defining a step-through space 17. A pair of lower down tubes 6a and a pair of upper down tubes 7a, both on the right and left sides, are downwardly and rearwardly extended from head pipe 5 in front of step-through space 17 so as to frame a fuel tank 18 and radiator 22, in the upper and lower positions, respectively. Fuel tank 18, which is arranged above radiator 22, has a lower part, namely bulge portion 20, which bulges downwards over the upper edge of the radiator 22 and toward the rear space of radiator 22 located below fuel tank 18. This forward face, designated at 21, of bulge portion 20, opposing the rear of radiator 22 is adapted to be inclined rearward and downward of the vehicle body.

As shown in FIG. 1, the frame includes: head pipe 5 which has inserted therein the shaft of a front fork assembly 4 for holding a front wheel 2 and supports it in a steerable manner; a pair of lower down tubes 6a, left and right, which droop rearwards from the bottom of head pipe 5 and then are curved and directed approximately horizontally towards the rear; a main tube 8 having at the end thereof a pair of pivot shaft supports for supporting the front end part of a swing arm unit 51 by means of a pivot shaft 52, with the pivot shaft supports thereof joined to the ends of lower down tubes 6a; a pair of upper tubes 7b, left and right, which are extended approximately parallel with the rearward extensions of lower down tubes 6a and join the drooping portions of lower down tubes 6a to the upper part of maim tube 8; a pair of upper down tubes 7a which droop from the top of head pipe 5 approximately in parallel with the drooping portions of lower down tubes 6a and are joined at their lower ends to the front parts of upper tubes 7b; and a rear tube 9 extended from the top of main tube 8 to the rear.

Figure 3:
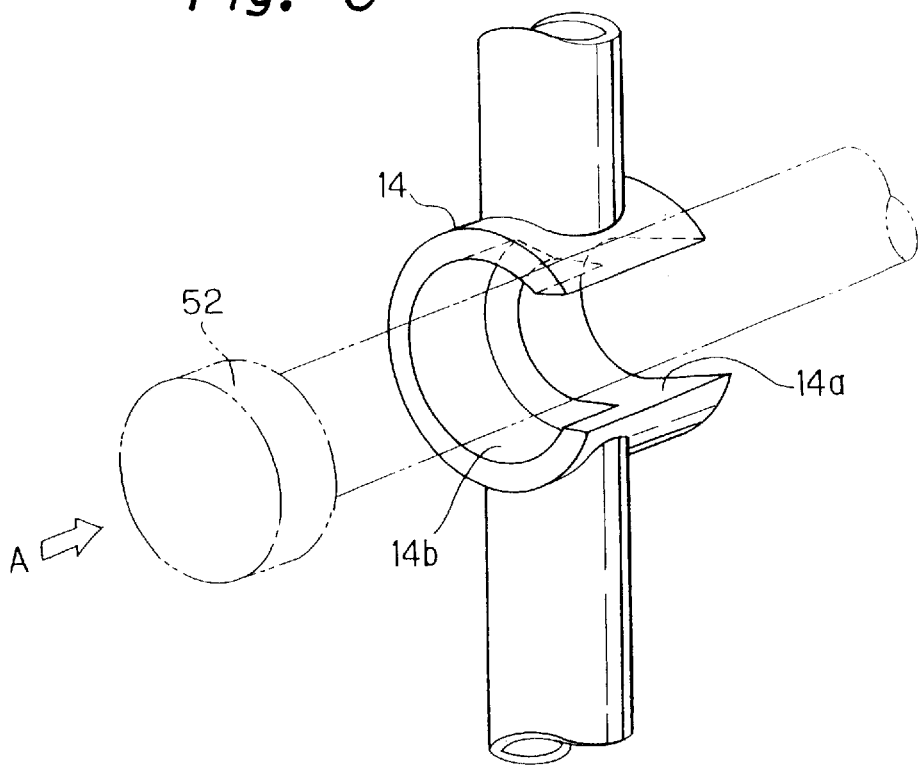
FIG. 3 is a perspective view showing the relationship between a pivot shaft hole and a pivot shaft in the embodiment of drive transmission device of a motorcycle according to the present invention.
Figure 4:
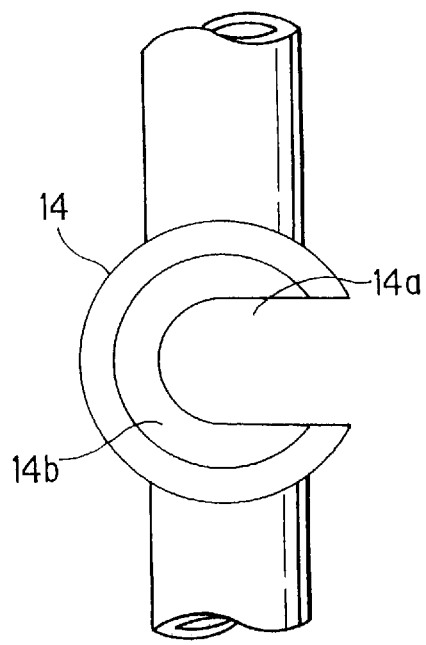
FIG. 4 is a perspective diagram viewed from the direction of arrow A in FIG. 3.

Main tube 8 has a pair of pivot shaft holes 14 cut out on both left and right sides thereof. Each pivot shaft hole 14, as shown in FIGS. 3 and 4, is configured of a shaft hollow 14a of an approximately U-shaped cutout opening to the rear of bodywork 1 and an approximately C-shaped indented portion 14b of an indentation having a greater diameter than shaft hollow 14a and arranged concentrically therewith. Thus, the pivot shaft is positioned in place in a manner such that the head and the nut or washer of pivot shaft 52 are fitted and hooked to indented portions 14b of pivot shaft holes 14.

Arranged in the rear part of the frame are saddle 15 and a stepped, pillion seat 16 adjacent to the rear of saddle 15.

Step-through space 17 is defined lower than saddle 15 between head pipe 5 and saddle 15. An engine unit 23 is mounted below step-through space 17 and saddle 15 while a cover 13 made up of a fairing 10, a body cover 12 and the like covers the whole bodywork, from head pipe 5 in the front part of bodywork 1 to the lower part below saddle 15 and pillion seat 16 in the rear part of bodywork 1.

Fuel tank 18, of the same figure as above, is formed in a vertically elongated shape basically having a bend to the rear in the lower portion thereof. This fuel tank has a refuelling cap 19 removably screw-fitted on the refuelling opening on the top thereof and has bulge portion 20 defined in the lower part thereof. Forward face 21, of this bulge portion 20, facing to the front side gradually becomes inclined to the scooter's rear towards the lower part of the scooter. Radiator 22 is configured of an upper tank, a lower tank, water pipes, cooling fins, etc., and is mounted slightly inclined with its upper and lower parts offset to the scooter's rear and front, respectively.

As shown in FIG. 1, in engine unit 23, a V-belt type stepless transmission 25 constituting a V-belt type electronic controlled transmission system (CVT) is incorporated integrally with a crankshaft 27 and a balancer shaft 26 of an engine 24, in an engine case 28, and a cylinder 29 with a cylinder head 30 mounted thereon is projected approximately horizontally in front of engine case 28. The engine tunnel structure is formed at the bottom of step-through space 17, extended fore and aft and ridged upward around the center of the step board with respect to the left and right direction thereof. Arranged inside this engine tunnel are cylinder 29 and cylinder head 30 while engine case 28 is arranged under saddle 15.

A conrod is connected to crankshaft 27 by means of crankpin and axially supported thereby while the conrod axially supports a piston 31 inside cylinder 29. Balancer shaft 26 is axially supported at a rear lower position of engine case 28. An oil pump 32 and water pump 33 are coupled at both extremes of this balancer shaft 26 so that these two, oil pump 32 and water pump 33, are driven by the rotation of balancer shaft 26. A spark plug 34 of cylinder head 30 of cylinder 29 is arranged so that its fastening axis is aligned to the direction toward the downwardness of fuel tank 18, as shown in FIG. 1.

V-belt type stepless transmission 25 is composed of a primary driven sprocket 37 to which the power from a primary drive sprocket 35 of crankshaft 27 is transmitted via a chain 36, a drive pulley 38 which, together with primary driven sprocket 37, is fitted on the drive pulley shaft, a driven pulley 39 fitted on the driven pulley shaft, and an endless V-belt 40 wound between these drive pulley 38 and driven pulley 39. This transmission 25 is integrally arranged above engine case 28 with a sectioning wall in between. Drive pulley 38 is composed of a fixed side face uni-bodied with the drive pulley shaft and a movable side face slidably fitted on the drive pulley shaft while V-belt 40 having teeth on the inner periphery thereof is held between these fixed and movable side faces.

The movable side face of drive pulley 38 is adapted to slide by the function of a gear 41 so as to change the pulley diameter. An output gear 43 of a motor 42 is arranged in the rear of gear 41. Gear 43 and gear 41 mesh each other via an idle gear 44. Driven pulley 39 is composed of a fixed side face uni-bodied with the driven pulley shaft and a movable side face slidably fitted on the driven pulley shaft and elastically urged toward the fixed side face by means of a spring. V-belt 40 is held between these fixed and movable side faces.

Fitted on the driven pulley shaft is a drive sprocket 45 forming a power transmission path to a rear wheel 53. Arranged between this drive sprocket 45 and a driven sprocket 46a fitted on a starting clutch 46 is an idle sprocket 48 which is axially attached and arranged coaxially with pivot shaft 52 of swing arm unit 50. An endless primary chain 47a and secondary chain 47b are wound between these sprockets and tensioned by a tensioner 49.

Figure 2:
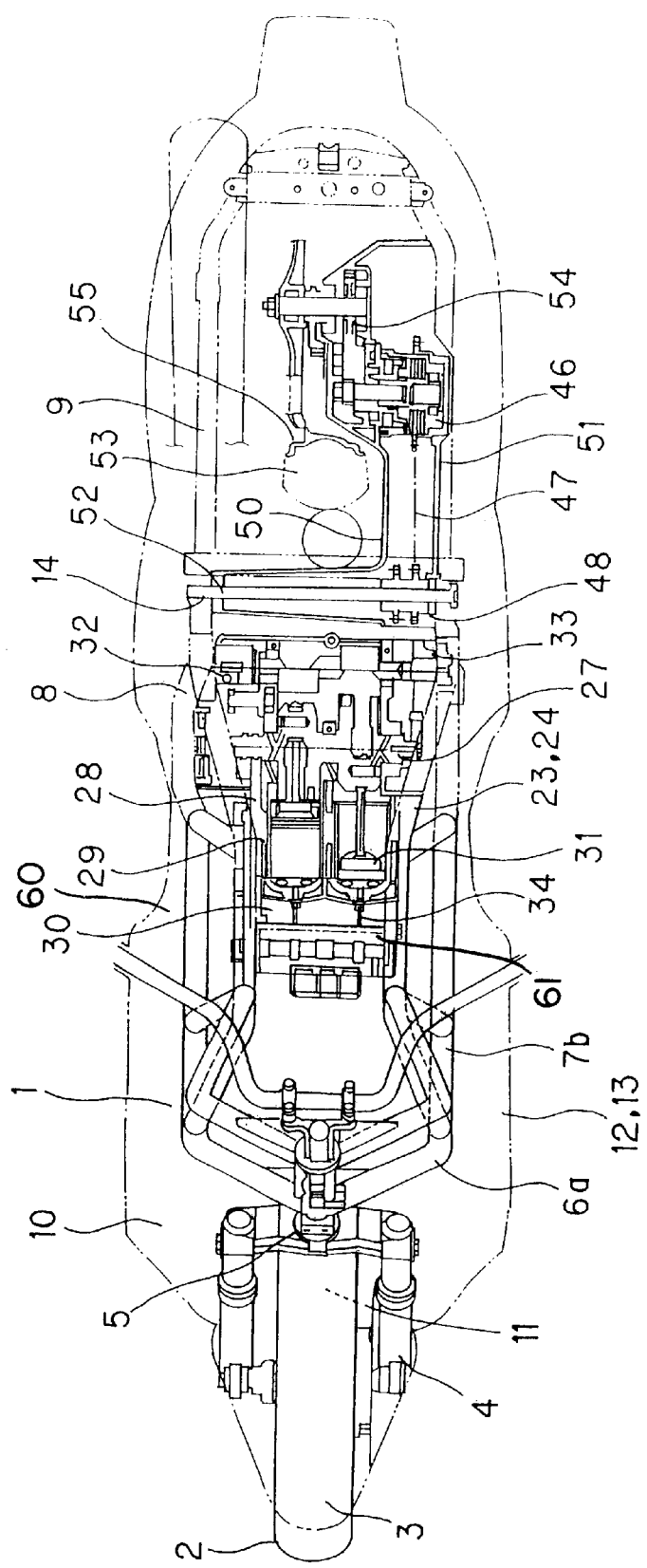
FIG. 2 is an illustrative plan view showing the embodiment of a scooter type vehicle according to the present invention.

As apparent from FIGS. 1 and 2, swing arm unit 50 includes: a case 51 for housing secondary chain 47; pivot shaft 52 which is arranged in, and penetrating through, a tubular portion lying in the left and right direction in the front part of case 51 and removably and axially supported together with idle sprocket 48 between a pair of pivot shaft holes 14; and starting clutch 46 of an electronic controlled electromagnetic clutch mechanism, arranged in the rear part of case 51. This starting clutch 46 transmits the driving force to rear wheel 53 by way of a final reduction gear series 54 so as to drive the rear wheel. As shown in FIG. 2, secondary chain 47 is positioned with the width of starting clutch 46 with respect to the left and right direction (lateral direction) of the scooter.

With above configuration, while the scooter is travelling, cooling air flows through the space between the upper part of a front fender 3 and a front fork under bracket 11 and other paths, passing by radiator 22, cools cylinder head 30 inside the engine tunnel and then is discharged toward the ground.

According to the above configuration, since forward face 21 of bulge portion 20 in the rear lower part of fuel tank 18 is inclined rearwards and downwards, even if fuel tank 18 is formed so as to bulge out below the upper edge of radiator 22, the cooling air stream arising during travelling is not obstructed but is guided without any resistance, by forward face 21 inclined rearwards and downwards. As a result, it is possible to provide a large enough volume for fuel tank 18. Since fuel tank 18 is arranged at a high position in step-through space 17, separately from saddle 15, refuelling can be performed without opening and closing saddle 15. Further, it is possible to open and close cap 19 of fuel tank 18 without being over.

Since fuel tank 18 is located away from the rider, this arrangement is markedly effective in eliminating the possibility of the fuel staining rider's shoes, clothes etc., unwillingly. Since starting clutch 46 is located inside the wheel rim (designated at 55) of rear wheel 53 when viewed from the side of the scooter, the width of engine unit 23 can be markedly reduced, which leads to making the space below saddle 15 remarkably narrow and compact. Further, compared to a typical configuration where a V-belt transmission is arranged inside the swing arm as the unit swing engine made up of an engine and swing arm integrated therein and where starting clutch 46 is arranged on the outer side of the variable speed pulleys of the V-belt transmission, this configuration makes it possible to reduce the width around rear wheel 53, thus making it possible to markedly improve the appearance and increase the angle of bank.

Since at least part of stepless transmission 25 and starting clutch 46 can be arranged within the projected area (designated at T) of wheel rim 55, this arrangement markedly contributes to reducing the width of the bodywork. Further, since swing arm unit 50 can be set to frame 1 with the nut on pivot shaft 52 loosed, it is possible to suspend swing arm unit 50 to main tube 8 while wheel rim 55, rear suspension etc. is being assembled to swing arm unit 50. Thus, assembly work and disassembly work can be markedly simplified.

Since cylinder 29 and cylinder head 30 are arranged approximately horizontally, the bottom of step-through space 17 can be made lower so as to allow the rider to put their feet relaxed. Since the heavy elements such as heavy V-belt type stepless transmission 25, balancer shaft 26 and the like are arranged forward compared to engine unit 23 of a unit swing type, it is possible to readily establish good fore-and-aft load balance, which allows stable riding even during travelling at high speeds.

As has been described heretofore, the present invention makes it possible to refuel without opening the saddle and is effective in eliminating the unwilling fuel staining. Also the operator can open and close the fuel tank cap in their easy position.

What is claimed is:

1. A scooter type vehicle comprising:

a front fork assembly having a rotatable front wheel at the lower position thereof and a handlebar at the upper position thereof;

a head pipe at the front end of a bodywork frame, rotatably supporting the front fork assembly;

part of the bodywork being bent downwards between the head pipe and a saddle, defining a step-through space; and a low floor, step board arranged at the bottom of the step-through space, wherein a pair of left and right down tubes are downwardly and rearwardly extended from the head pipe in front of the step-through space so as to frame a fuel tank and planiform radiator, in the upper and lower positions, respectively; the fuel tank, which is arranged above the radiator, has a lower part which bulges downwards over the upper edge of the radiator and toward the rear space of the radiator located below the fuel tank; and the forward face of the bulge portion, opposing the rear face of radiator is adapted to be inclined rearward and downward.

2. The scooter type vehicle according to claim 1, further comprising:

an engine and transmission integrally formed into an engine unit;

an engine case portion which integrally incorporates the crankshaft of the engine unit and the transmission and is arranged under the saddle;

a cylinder portion projected forwards in an approximately horizontal direction from the engine case portion; and a tunnel structure forming an engine tunnel, which is extended fore and aft and ridged upward in the step-through space around the center of the step board with respect to the left and right direction thereof, wherein the cylinder portion is arranged inside the engine tunnel while a spark plug provided on top of the cylinder head is arranged with its fastening axis aligned to the direction toward the downwardness of the fuel tank.

3. The scooter type vehicle according to claim 1, wherein the radiator arranged below the fuel tank in the rear of the front wheel is attached to the bodywork so as to be inclined with its lower portion directed forward.

4. The scooter type vehicle according to claim 2, wherein the radiator arranged below the fuel tank in the rear of the front wheel is attached to the bodywork so as to be inclined with its lower portion directed forward.

* * * * *